United States Patent Office 3,162,672
Patented Dec. 22, 1964

3,162,672
O - TRIFLUOROMETHYLMERCAPTOPHENYL ESTERS OF PENTAVALENT PHOSPHORUS ACIDS
Hans Richert, Leverkusen, Gerhard Schrader, Wuppertal-Cronenberg, and Heinz Jonas, Leverkusen, Germany, assignors to Farbenfabriken Bayer Aktiengesellschaft, Leverkusen, Germany, a corporation of Germany
No Drawing. Filed Oct. 30, 1962, Ser. No. 234,246
Claims priority, application Germany Nov. 22, 1961
6 Claims. (Cl. 260—461)

The present invention is concerned with a process for the production of phosphoric, phosphonic, phosphinic or thio-phosphoric, -phosphonic, -phosphinic acid esters of the general formula

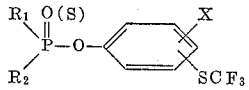

wherein $R_1$ and $R_2$ stand for the same or different saturated or unsaturated preferably lower alkyl or lower alkoxy radicals, whilst X means hydrogen, a halogen such as a chlorine and atom, a lower alkyl or alkoxy group.

It has been found that compounds of the above-mentioned general formula are easily obtained and with good yields by reacting O,O-dialkyl-(thiono)-phosphoric, alkyl-O-alkyl-(thiono)-phosphonic or dialkyl-(thiono)-phosphinic acid halides, with trifluoromethyl-mercaptophenols of the general composition

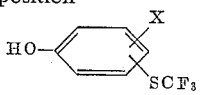

preferably in the presence of acid-binding agents, X having in the last-given formula the meaning indicated above.

As acid-acceptors, especially anhydrous alkali metal carbonates or alcoholates come into question. It is, however, just as well possible to prepare first salts, preferably alkali metal salts, of the appropriate trifluoro-methyl-mercapto phenols and to subject these then to further reaction in accordance with the process claimed.

The reaction according to the process is preferably carried out with the use of an inert organic solvent. Besides hydrocarbons, low-molecular aliphatic ketones and nitriles, such as acetone, methyl ethyl or methyl isopropyl ketone as well as aceto- or propionitrile have been found particularly suitable for this purpose.

Furthermore, it has proved to be expedient to carry out the process according to the invention at a normal or slightly elevated temperature and to continue, after the starting components have been combined, stirring the reaction mixture for some time, whilst heating, in order to complete the reaction.

The trifluoro-methyl mercapto phenols required as starting materials are expediently prepared according to the indications of German patent application F 35 276 IVb/12q (Le A 6992) by introducing trifluoro-methyl sulphenyl-chloride into the corresponding phenols at temperatures between 0 and 200° C., preferably at 80 to 100° C., and optionally in the presence of Friedel-Crafts catalysts and of inert solvents (cf. the representative Examples A, B, C and D).

In comparison with the known dialkyl-(thiono)-phosphoric (-onic, -inic) acid esters of the methylmercapto phenols, the compounds obtainable according to the process are distinguished by a considerable increased insecticidal action. In consideration of these surprising, technically valuable properties, the products of the process are intended to be used as pest control agents, especially in plant protection.

The application of the preparations takes place in the customary manner for pest control agents based on phosphoric acid ester compounds, i.e. preferably in combination with suitable solid or liquid extending or diluting agents.

The following Examples 1–5 are given for the purpose of illustrating the invention.

The table below indicates the efficiency of the products obtainable according to the invention under the conditions of Examples 1 to 5.

The efficiency of the products is determined in the usual manner. The emulsions are prepared by dissolving the active ingredient in dimethyl formamide and diluting the solution with water with the addition of an emulsifier. The concentrations of the active ingredient given in the table refer to the maximum degree of dilution which is still effective.

| Active ingredient corresponding to— | Active ingredient concentration in percent | Killing rate, percent |
|---|---|---|
| Example 1: | | |
| Flies | 0.0001 | 100 |
| Spider mites | 0.001 | 100 |
| Example 2: | | |
| Flies | 0.0001 | 100 |
| Aphids | 0.004 | 90 |
| Example 3: | | |
| Flies | 0.0001 | 100 |
| Systemic action | 0.1 | 100 |
| Example 4: | | |
| Caterpillars | 0.001 | 100 |
| Spider mites | 0.004 | 98 |
| Example 5: | | |
| Caterpillars | 0.001 | 100 |
| Mosquito larvae | 0.000001 | 100 |

*Example A*

50 g. (0.53 mol) of phenol are dissolved in 30 ml. of chlorobenzene and mixed with 20 g. of ferric chloride (anhydrous, sublimed). Into the well-stirred slurry, 27 g (about 0.16 mol) of approx. 80% trifluoro-methyl-sulphenyl chloride are introduced at room temperature in the course of 3½ hours. This is followed by heating to 50° C. for an hour. After cooling it is shaken with 100 ml. of water several times, dried over sodium sulphate and fractionally distilled. Besides chlorobenzene and unreacted phenol there are obtained 12 g. of colourless, crystalline trifluoro-methylmercapto phenol. B.P. 211–212° C. at 746 mm. Hg, B.P. 110° C. at 15.5 mm. Hg, M.P. 56–59° C. Yield about 30% of the theoretical calculated on trifluoro-methylsulphenyl chloride.

Analysis:

| | Calculated | Found |
|---|---|---|
| Percent F | 29.4 | 28.5 |
| Percent S | 16.5 | 17.2 |
| Mol Wt | 194 | 196 |

*Example B*

Into a solution of 500 g. (5.3 mol) of phenol in 350 ml. of chloro-benzene, 220 g. (about 1.45 mol) of about 90% trifluoro-methylmercapto-sulphenyl chloride are introduced at 80–90° C. in the course of 3 hours. The hydrogen chloride evolved is led off at −78° C. through a cooler, whereupon about 30 g. of unreacted trifluoro-methylsulphenyl chloride condense. To expel the hydrogen chloride the reaction is heated on the water bath for an hour in a current of nitrogen. It is then fractionally distilled. 179 g. of a fraction are obtaned which boils between 185 and 211° C. and consists of about equal parts of phenol and 4-trifluoro-methylmercapto phenol, and 73 g. 4-trifluoro-methylmercapto phenol as well; B.P. 99–99.5° C. at 13.5 mm. Hg, M.P. 58–59° C. Yield of pure product in relation to fluoro methylsulphenyl chloride used, about 26%.

*Example C*

107 g. (about 0.63 mol) of about 80% trifluoro-methylsulphenyl chloride are introduced into 100 g. (0.93) of o-cresol at about 80° C. The unreacted trifluoro-methylsulphenyl chloride is collected in a receiver and used again. The further operation proceeds as described in Example 2.

70 g. of a weakly reddish coloured viscous liquid are obtained; B.P. 106° C. at 13.2 mm. Hg. The substance is identified by the infra red spectrum as 2-methyl-4-trifluoro-methylmercapto phenol. Yield about 53% of the theoretical.

Analysis:

|  | Calculated | Found |
| --- | --- | --- |
| Percent F | 27.4 | 27.6 |
| Percent S | 15.4 | 16.0 |
| Mol wt | 208 | 208/227 |

*Example D*

According to the instructions given in Example 3, 165 g. (1.54 mol) of m-cresol are reacted with 165 g. (about 1.1 mol) of about 90% trifluoro-methylsulphenyl chloride. 154 g. of a weakly yellowish viscous liquid are obtained; B.P. 114.5° C. at 15 mm. Hg. By the infra red spectrum the substance is identified as 3-methyl-4-trifluoro-methylmercapto phenol, yield about 67% of the theoretical.

Analysis:

|  | Calculated | Found |
| --- | --- | --- |
| Percent F | 27.4 | 26.8 |
| Percent S | 15.4 | 15.6 |
| Mol wt | 208 | 202/229 |

As by-product about 5 g. of a white crystalline substance is obtained with a peppermint taste; B.P. 78° C. at 14 mm. Hg. According to gas chromatogram it consists of a number of phenols; the main component (76%) is identified by infra red spectrum as 3-methyl-6-trifluoro-methylmercapto phenol.

*Example 1*

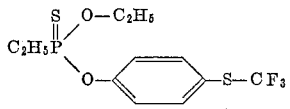

49 g. (0.25 mol) of 4-trifluoro-methylmercapto phenol are dissolved in 200 cc. of acetonitrile. 40 g. of powdered and screened potassium carbonate are added to this solution and 44 g. (0.25 mol) of ethyl thionophosphonic acid-O-ethyl ester chloride are subsequently added dropwise with stirring at 30 to 40° C. to the reaction mixture, which is then stirred for a further 2 hours at the temperature indicated and subsequently poured into 400 cc. of ice water. The separated oil is taken up in 300 cc. of benzene. The benzene solution is washed several times with water, subsequently separated and dried over sodium sulphate. By fractional distillation, 67 g. of ethyl-thionophosphonic acid-O-ethyl-O-(4-trifluoro-methylmercapto-phenyl-)-ester are obtained after evaporation of the solvent. The preparation boils at 89° C./0.01 mm. Hg. It is a colourless water-insoluble oil.

*Example 2*

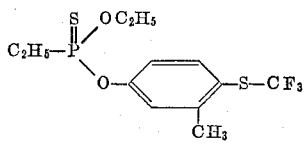

To a solution of 69 g. (0.33 mol) of 3-methyl-4-trifluoro-methylmercapto phenol in 200 cc. of acetonitrile, there are first added 55 g. of finely powdered potassium carbonate and the mixture is subsequently treated dropwise with vigorous stirring at 30 to 40° C. with 58 g. (0.33 mol) of ethyl thionophosphonic acid-O-ethylester chloride. In order to complete the reaction, the mixture is then stirred for a further 3 hours at the temperature indicated and then poured into 400 cc. of ice water. The seperated oil is taken up in 300 cc. of benzene, the benzene solution is washed several times with water, separated from the aqueous phase and dried over sodium sulphate. By subsequent fractional distillation, 97 g. of ethyl thionophosphonic acid-O-ethyl-O-(-3-methyl-4- trifluoro-methylmercapto-phenyl-)-ester are obtained, corresponding to a yield of 84% of the theoretical. The ester is practically insoluble in water.

The mean toxicity of the compound on rats per os amounts to 17.5 mg. per kg. of animal.

*Example 3*

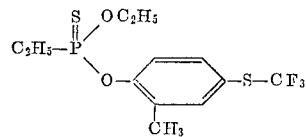

69. g. (0.33 mol) of 2-methyl-4-trifluoro-methyl mercapto phenol are dissolved in 200 cc. of acetonitrile, this solution is first treated with 55 g. of finely powdered potassium carbonate, and 58 g. of ethyl-thionophosphonic acid-O-ethylester chloride are subsequently added dropwise, with stirring, at 30 to 40° C. to the reaction mixture which is then stirred for a further 3 hours at the indicated temperature and then worked up as described in the Examples 1 and 2. 86 g. (75% of the theoretical) of ethyl thionophosphonic acid - O - (2 - methyl - 4 - trifluoro-methylmercapto-phenyl-)-ester of boiling point 92° C./0.01 mm. Hg are thus obtained.

*Example 4*

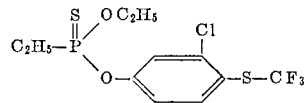

A solution of 58 g. (0.25 mol) of 3-chloro-4-trifluoromethyl-mercapto phenol in 200 cc. of acetonitrile is treated with 40 g. of finely powdered potassium carbonate. 44 g. of ethyl thionophosphonic acid-O-ethylester chloride are subsequently added dropwise, with stirring, at 30 to 40° C. to the mixture, the latter is heated for a further 2 hours to 30 to 40° C. and then worked up as described in the Examples 1 and 2. 76 g. (73% of the theoretical) of ethyl thionophosphonic acid-O-ethyl-O-(3-chloro-4-trifluoro-methylmercapto-phenyl-)-ester of boiling point 100° C./0.01 mm. Hg are obtained.

*Example 5*

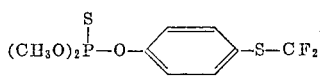

65 g. (0.3 mol) of 4-trifluoro-methylmercapto phenol are dissolved in 250 cc. of acetonitrile. This solution is treated, whilst stirring, with 54 g. of dried and screened potassium carbonate, 54 g. of O,O-dimethyl thionophosphoric acid chloride are then added dropwise at about 40 to 45° C. to the mixture and the latter is heated for a further 3 hours at 60° C. The reaction mixture is subsequently poured into 300 cc of ice water, the separated oil is taken up in 200 cc of benzene, the benzene solution washed once with water and subsequently dried over sodium sulphate. By the following fractional distillation, after evaporation of the solvent, 96 g. (90% of the theoretical) of O,O-dimethyl-O-(4-trifluoro-methylmercapto-phenyl)-thionophosphoric acid ester of boiling point 84° C./0.01 mm. Hg are obtained.

We claim:
1. A compound of the formula

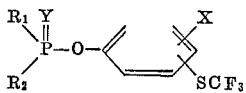

in which
R₁ stands for a member selected from the group consisting of lower alkyl and lower alkoxy and R₂ stands for lower alkoxy;
X stands for a member selected from the group consisting of hydrogen, chlorine, and lower alkyl; and
Y stands for a member selected from the group consisting of oxygen and sulfur.

2. Compound of the formula

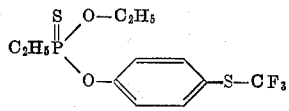

3. Compound of the formula

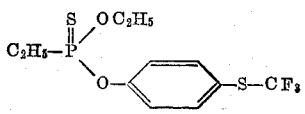

4. Compound of the formula

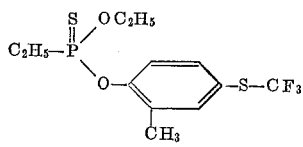

5. Compound of the formula

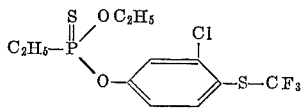

6. Compound of the formula

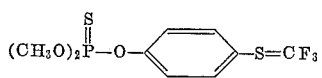

References Cited in the file of this patent
UNITED STATES PATENTS

| | | |
|---|---|---|
| 2,916,509 | Schegk et al. | Dec. 8, 1959 |
| 3,042,703 | Schegk et al. | July 3, 1962 |

FOREIGN PATENTS

| | | |
|---|---|---|
| 1,129,959 | Germany | May 24, 1962 |

OTHER REFERENCES

Schrader: "Angew. Chem.," vol. 73, pages 331–334 (May 1961).